United States Patent [19]

Ishikawa et al.

[11] Patent Number: 4,819,718

[45] Date of Patent: Apr. 11, 1989

[54] HEAT EXCHANGING UNIT WITH A HYDROGEN ADSORPTION ALLOY

[75] Inventors: Hiroshi Ishikawa; Keisuke Oguro; Hiroshi Suzuki; Akihiko Kato; Teruya Okada; Shizuo Sakamoto; Iwao Nishimura, all of Osaka; Keizo Sakaguichi, Hyogo, all of Japan

[73] Assignee: Agency of Industrial Science & Technology and Kurimoto Ltd., Nishi, Japan

[21] Appl. No.: 851,624

[22] Filed: Apr. 14, 1986

[30] Foreign Application Priority Data

Feb. 24, 1986 [JP] Japan .................................. 61-38744

[51] Int. Cl.$^4$ ............................................. F25B 17/08
[52] U.S. Cl. .................................. 165/104.12; 62/48; 55/269; 206/0.7; 29/157.3 R
[58] Field of Search ............... 165/104.12, 907; 62/48; 55/269; 206/0.7; 29/157.3 R

[56] References Cited

U.S. PATENT DOCUMENTS 4,457,136 7/1984 Nishizabi et al. ............. 165/104.12
4,609,038 9/1986 Ishikawa et al. ........................ 62/48
4,674,563 6/1987 Laxhuber ...................... 165/104.12

FOREIGN PATENT DOCUMENTS

68448 6/1978 Japan ............................. 165/104.12

Primary Examiner—Albert W. Davis
Attorney, Agent, or Firm—Jones, Tullar & Cooper

[57] ABSTRACT

This invention relates to a novel heat exchanging unit with a hydrogen adsorption alloy of which thermal conductivity is kept high over a long period of use. Particularly in order to solve problems occurring at the time of forming a heat exchanging unit, by forming a compact of a hydrogen adsorption alloy and inserting a heat transfer element in the compact, such as insufficient heat transfer due to a small spacing produced between the compact and the heat transfer element, surface irregularities, decline in function due to micronization and scattering of the compact, difficulty in built-up, etc., there is disclosed a heat exchanging unit comprising a heat transfer element and a hydrogen adsorption alloy fitted to an inner periphery of the heat transfer element and solidly molded.

14 Claims, 9 Drawing Sheets

HEAT EXCHANGING UNIT WITH A HYDROGEN ADSORPTION ALLOY

CROSS REFERENCE TO RELATED APPLICATION

This application discloses subject matter in common with application, Ser. No. 851,622, filed Apr. 14, 1986.

BACKGROUND OF THE INVENTION

1. Field of the Invention

This invention relates to a heat exchanging unit with a hydrogen adsorption alloy mainly composed of metal hydride, and more particularly to a heat exchanging unit having a high heat exchange efficiency which is difficult to reduce in spite of repeated uses when the unit is incorporated into a heat exchanger.

2. Prior art

Heretofore, several arts have been developed in which hydrogen is adsorbed in a certain metal or alloy to be stored therein and transferred therefrom in the form of a metal hydride. These arts have been further applied to such practical use as purification of hydrogen, pressure rise, heat pump, airconditioning system, etc.

In such case, since an exothermic reaction or an endothermic reaction is necessarily taking place at the time the metal hydride adsorbs or discharges hydrogen, it is possible to take advantage of such a property for a heat exchanger, heat pump, etc.

When it is a principal object to store or transfer hydrogen, delivery of hydrogen is not effectively performed without rapid delivery of heat between the metal hydride and the outside in view of the high thermal efficiency of the heat exchanger of efficient storage and transfer of hydrogen.

However, a thermal conductivity of hydrogen adsorption alloy itself in the form of particles is not high, and therefore several attempts have been proposed aiming at efficient delivery of heat.

According to one of the proposed attempts, in order to improve the hydrogen adsorption alloy itself, surfaces of the particles are plated with a dissimilar metal of high thermal conductivity as described later with reference to this invention.

Figure 19:
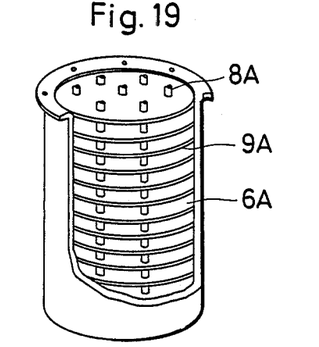
FIGS. 19 to 21 are perspective view showing various prior arts, respectively.
Figure 20:
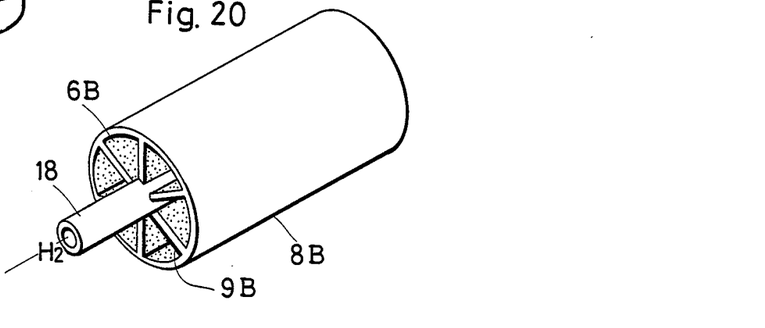

According to another attempt, the structure of a heat exchanging unit is improved so that a hydrogen adsorption alloy in the form of particles is brought into contact with a heat transfer element as close as possible. For example, as shown in FIG. 19, a heat exchanger manufactured by Solar Turbines Incorporated is disclosed, wherein a heat pump for temperature rise is provided with a tube and fins outside as a heat transfer element. Fourteen copper tubes 8A are disposed in fins 9A of large diameter being 0.02 inch in thickness, and spaces formed between the fins at an interval of 0.15 inch (3.8 mm) are filled with a metal hydride 6A. FIG. 20 shows another heat exchanger for a prototype heat pump disclosed by the same company, having six radial fins 9B disposed in a copper tube 8B of 1 inch (25.4 mm) in inner diameter. Numeral 18 is a filter in FIG. 20. These two drawings are shown in pages 67 and 72 of Metal Hydride/Chemical Heatpump Development Product. Phase 1, Final Report, BNL-51539 published by Brookhaven National Laboratory.

Figure 21:
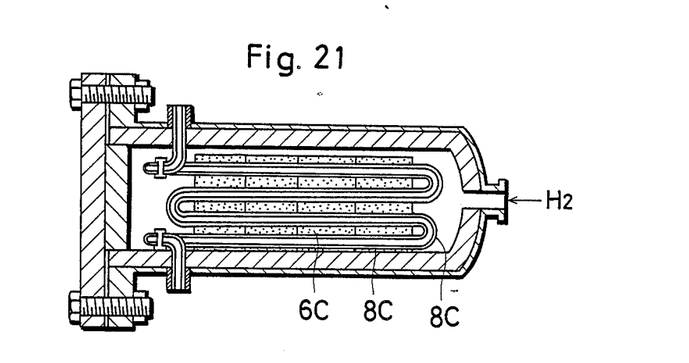

A further proposed attempt is one which utilizes compression molding. FIG. 21 shows a proposal already made by the applicant and disclosed in U.S. Pat. No. 4,609,038, wherein surfaces of particles of hydrogen adsorption alloy are coated with a dissimilar metal by plating and molded into a compact 6C, apertures and then perforated through the compact to insert a heat exchanging pipe 8C therethrough, the ends of the pipe being respectively communicated with a supply port and an exhaust port for a heating or cooling medium. A modification of this proposal is also disclosed in the foregoing application, wherein particles of hydrogen adsorption alloy coated with a dissimilar metal by plating are infiltrated into a porous material of high thermal conductivity and this porous material is formed into a compact by compression molding.

In effect, in order to improve thermal efficiency of a heat exchanger using a hydrogen adsorption alloy, there have been proposed means for improving the hydrogen adsorption alloy itself, means for increasing contact areas between the alloy particles and heat transfer surfaces as much as possible (by Solar Turbines Incorporated), and a method for improving a compact of hydrogen adsorption alloy formed by compression molding (i.e., porous metal matrix hydrides) proposed by Prof. Ron Technion and further improved by applicant.

The foregoing proposals, however, have their respective problems to be solved.

In the first attempt of improving a hydrogen adsorption alloy itself to elevate thermal conductivity, there is a limit in distance within which heat can be transferred from a heat transfer surface, since the thermal conductivity is essentially low when the alloy is in the form of particles. By the same reason, sufficient improvement of thermal conductivity is not attained, either, even when a lot of fins are densely fitted for rapid delivery of heat in the second attempt of increasing the contact area.

In this connection, a filter is usually fitted for shielding the alloy from outside in order to prevent the alloy particles from floating and getting out, but since an apparent specific gravity of the alloy is small and there is no bonding strength among particles when the alloy is in the particle state, such shielding does not bring a stable holding of the alloy. That is, when the hydrogen adsorption alloy is repeatedly used, such free particles are further micronized and collapsed by repetition of shrinkage and expansion loading eventually to the particles getting out and being scattered. In this way, when lots of fins are densely fitted to increase the heat transfer area, the thermal conductivity is declines rather than improved.

In the third attempt of molding the particles into a compact, thermal conductivity is indeed considerably improved as compared with the form of particles or powder, but a problem exists in how to make close contact between a heat-transfer element and a hydrogen adsorption alloy compact without maintaining a heat insulating boundary. For example, in the case of arranging a heat exchanging unit by forming a compact of alloy (formed by compression molding) as shown in FIG. 21 and inserting several heat transfer pipes (copper pipes) through inside of the compact, it is necessary to provide through holes for insertion of the heat-transfer pipes. Such through holes can be made directly on the compact after molding it. It is also possible to arrange preliminarily a mold suitable for formation of such holes. But in any case, a spacing is required between the compact and the heat transfer pipe, because without such spacing it is impossible to build-up a heat exchanging unit by the insertion of pipes.

Thus, it is an essential requirement for the prior art to maintain a spacing, and this spacing negatively affects the heat transfer between the heat transfer element and the compact of hydrogen adsorption alloy.

SUMMARY OF THE INVENTION

Accordingly, the ultimate goal of this invention is to provide a novel heat exchanging unit with a hydrogen adsorption alloy the thermal conductivity of which is kept high over a long period of use.

In order to accomplish the foregoing goal, it is a first object to prevent deterioration of surface stability of the compact due to partial collapse and micronization thereof resulting in an irregular surface when making a hole through the compact for insertion of a heat transfer element or when actually inserting a pipe through the hole.

It is a second object not to produce a spacing at all between the surface of the compact and the heat transfer element, i.e., to establish a solid heat transfer relation therebetween so that the collapse and micronization of the compact starting from this spacing portion due to repetition of shrinkage and expansion may be successfully prevented.

It is a third object to attain various modifications of a heat exchanging unit difficult to attain under the prior art by a relatively simple method. As a matter of fact, a rather intricate process will be required when fitting fins to the compact, and there may be cases nearly impossible to fit them. For example, in the case of an arrangement in which the inner periphery of a cylindrical tube is wound with concentric spiral fins, it is quite difficult to incorporate the compact between the spiral fins.

The foregoing objects are accomplished by providing a heat exchanging unit with a hydrogen adsorption alloy comprising a tubular heat transfer element in the axial center of which an elastic hollow cylindrical core mold with its outer diameter smaller than an inner diameter of the heat transfer element is inserted, and fine particles of hydrogen adsorption alloy infiltrated between an inner wall of the heat transfer element and an outer wall of the core mold, both ends of the heat transfer element being engagedly closed by elastic cap members and the that transfer element containing the core mold and fine particles of hydrogen adsorption alloy being solidly formed into an unit by compression molding in a pressure vessel using a fluid as a medium by applying an even pressure uniformly from an inner wall of the heat transfer element and an outer wall of the core mold.

Several modifications of the tubular heat transfer element can be attained on condition that a material of high thermal conductivity is used. These modifications can be a straight tube, a straight corrugated tube, a bend tube, a curved corrugated tube, a combination of a plurality of straight tubes and/or bend tubes, a combination of a plurality of straight and/or curved corrugated tubes, and a structure with a lot of fins projected either radially on the outer and/or inner periphery of respective tube or making a right angle to the axis of the tube.

The function of this invention in connection with the noted arrangement is as follows.

First, the elastic cylindrical core mold with its diameter smaller than the outer diameter of the tubular heat transfer element is inserted in the heat transfer element, one end of the heat transfer element is closed by the cap member to fill the heat transfer element with particles of the alloy, and after filling the element with particles, another end is closed with the other cap member to confine the particles. In this connection, both ends of the core mold are projected out of both ends of a closing member comprising the cap members and the heat transfer element. Since the two cap members as well as the core mold passing through them are composed of elastic material, a tightly closed state is successfully attained by elasticity enabling mutual tightening.

Keeping the foregoing state, a component comprising the heat transfer element, cap members, core mold and particles of hydrogen adsorption alloy is placed in a pressure vessel, and either a liquid pressure or an air pressure is evenly applied to the whole part from both the inner wall of the core mold and the outer wall of the heat transfer element. Since both the core mold and the cap members are elastic, the cap members are uniformly compressed and the core mold is uniformly expanded by the fluid pressure used as a medium eventually pressing the hydrogen adsorption alloy inside. Since the equal pressure is also applied to the tubular heat transfer element from outside, the pressure is balanced through the tube, and the hydrogen adsorption alloy inside is evenly pressed. As a result, the hydrogen adsorption alloy in the form of fine particles is subject to an accurate and uniform molding.

The function described above is exhibited in the same way with any of the modifications disclosed by using a closing member matched to each modification of heat transfer element. The function remains unchanged whether a tubular heat transfer element is provided with fins on the outer and/or inner periphery thereof or not and whether a single element or plural elements are incorporated, so long as the closing member is fit for the heat transfer element.

Thus, in accordance with this invention, since the heat transfer element and particles of hydrogen adsorption alloy are solidly and uniformly pressed and formed into a unit, every element is perfectly bonded to each other without any spacing between them, and there is no heat insulating boundary negatively affecting the delivery of heat at all.

Furthermore, when applying such an integral heat exchanging unit to a heat exchanger, the unit is prevented from being micronized, broken, etc. at the time of build-up, and surface stability of the alloy is well maintained. Accordingly, micronization or collapse of the alloy compact of the unit will surely be reduced in the course of operation of the heat exchanger. In addition, there is no restriction on the shape of the unit as far as a tubular heat transfer element is used and various modifications can be selected as above mentioned.

Besides the foregoing advantages, it is to be noted that at the process of molding the particles of hydrogen adsorption alloy by a liquid pressure press according to this invention, a pressure of 1.5–2.0 $T/cm^2$ is quite enough for the molding while 5 $T/cm^2$ is required under a conventional one-way press. This advantage is attained because of the application to uniform pressure also from the hollow portion of the core mold, although a press of uniform pressure itself is well known for its applicability to molding of particles.

Furthermore, since the particles of hydrogen adsorption are infiltrated in the heat transfer element and solidly molded into a unit, it means that the unit has a durable outer shell on its outside which protects the alloy inside from being broken. This outer shell exhibits also an excellent holding force meeting the shrinkage and expansion of the alloy thereby preventing the micronization and collapse of the alloy.

It is to be noted that the heat transfer element serves also as a kind of outer mold for the compact of the alloy, which is advantageous in view of economy of equipment and pressure required since by such arrangement a rather low pressure is enough for the molding as compared with a molding with any outer mold. In other words, it is possible to produce a solid unit which is larger than one produced by using the outer mold under the same press.

When applying a heat exchanging unit according to this invention to a heat exchanger, an axial through hole formed in the compact of alloy after taking out the core mold is used as an inlet and an outlet for hydrogen. The heat transfer tube performs delivery of heat with its outer periphery surrounded by a heating or cooling medium. Accordingly, it is not necessary for the whole equipment to be covered with a pressure vessel, but a simple arrangement, in which a heat transfer tube is disposed in a water sealing vessel and the inlet and the outlet are connected to the axial through hole of the unit opened on both ends of the heat transfer tube, is quite sufficient for the effective delivery of heat. In effect, a simple structure and easy maintenance are insured by this invention.

BRIEF DESCRIPTION OF THE DRAWINGS

Other features of this invention will be apparent in the course of the following description in conjunction with the accompanying drawings wherein.

DESCRIPTION OF THE PREFERRED EMBODIMENT

Figure 3:
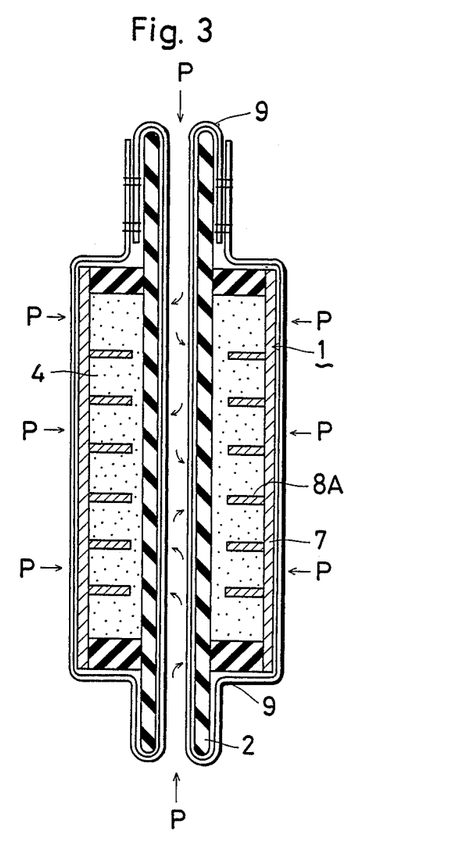
FIG. 3 is a sectional front view showing an assembled state of the closing member and heat transfer element.

Referring to FIG. 3, a tubular heat transfer element 1 comprises a heat transfer tube 7 and fins 8A which are composed of a thermal conductive copper or aluminum metal. In this embodiment, the tube 7 is 25 mm in outer diameter and 1.0 mm in thickness, and fins 8A of 0.5 mm in thickness and 3 mm in height are projected inwardly at intervals of 5 mm on the inner periphery of the tube. This embodiment includes any modification equipped with either inner fins 8A or outer fins 8B or both of them. In any modification, a tube with fins wound concentrically making a right angle to the axis of tube is used.

All of the core mold 2 and the cap members 3, 5 are composed of a soft synthetic rubber, and the core mold is 1.5 mm in thickness and 3 mm in inner diameter of a hollow portion, while each cap member is 10 mm in thickness. Since both core mold and cap members are elastic, they are deformed a little by a mutual fitting force and tightly fitted on their boundary pressing each other.

First, the cap member 3 is fitted to the heat transfer tube 7, the core mold 2 is inserted in the tube and one end of the core mold is taken out passing through the cap member 3.

Then, a spacing between the core mold 2 and the heat transfer tube 7 is filled with fine particles (powder) of hydrogen adsorption alloy 4. Usually it is easy to infiltrate the fine particles when they are dry. In order to fill up spaces between the fins with particles, it is preferred to vibration or swing the heat transfer tube when necessary. The hydrogen adsorption alloy to be used is not always necessary to be specified, but in this embodiment, in view of achieving the foregoing objects as effectively as possible, a preceding invention entitled "Method for manufacturing hydrogen adsorption alloy material" which was filed by a part of the applicants of the present invention and laid open under Japanese provisional publication No. 59-46161 is employed as described hereafter.

In the first place, a Mm $Ni_{4.5}Mn_{0.5}$ is transformed to a powdered material of fine particles the average grain size of which is approximately 15 $\mu$m by repeating the absorption and discharge of hydrogen. Then, after being degreased and cleaned, the powdered material is coated with copper by means of a wet electroless plating of autocatalysis using a reducer. In this process, the powdered material is directly immersed into a plating solution for surface reaction thereof, but when the initiation reaction is insufficient, the powdered material is to be immersed in a known activator solution containing a palladium salt for activation treatment.

In this autocatalytic electroless plating with copper using a reducer, a formaldehyde is used as a reducer, and a plated film of approximately 1 $\mu$m in thickness is formed by the plating process for about 40 minutes at 30° C. while stirring an electroless plating solution of TMP chemical copper #500 (produced by Okuno Chemical Industries Co., Ltd.). After the surface reaction, the fine particles are washed in water and dried at a low temperature.

After filling up with the fine particles, the cap member 5 is fitted to the heat transfer element and a perfect sealing is attained due to the elasticity thereof.

Figure 1:
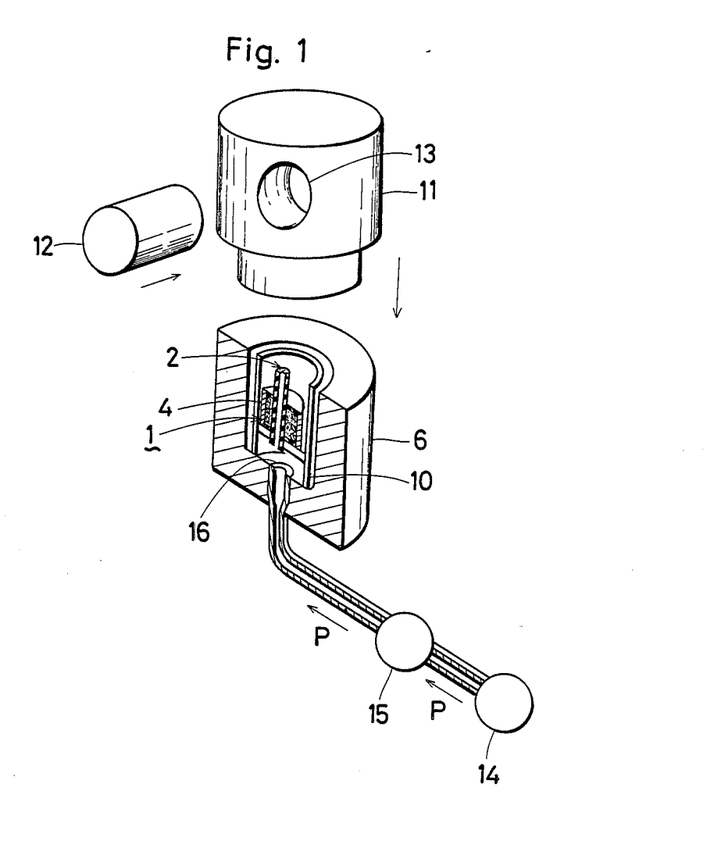
FIG. 1 is a partial sectional perspective view showing an embodiment according to this invention.
Figure 2:
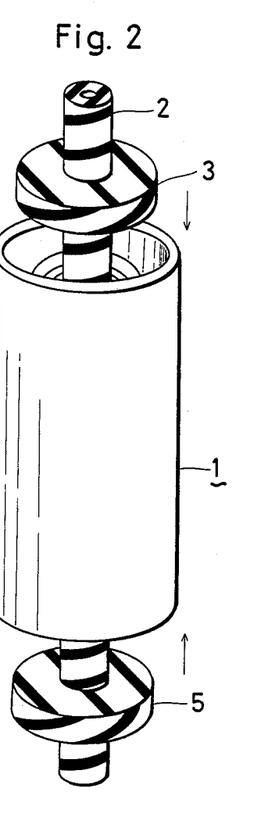
FIG. 2 is an exploded perspective view showing a closing member and a heat transfer element.

A pressure is then applied to this sealing (closing) member using a fluid as a medium. At this step, a certain know-how is required in order to prevent the medium flowing into the closing member and contracting the hydrogen adsorption alloy inside. In this embodiment, as shown in FIG. 3, a cylindrical film 9 of thin, flexible and soft rubber is applied to the whole closing member so as to wrap it. Then, one end of the cylindrical film is folded and inserted in the core mold from one end thereof to be taken out of the other end being sucked by a vacuum pump. The end taken out is further pulled by the vacuum pump to impart a tension to the wrapping film 9 and fastened to the other end with which it is overlapped. A tight fit is thus attained between the film and the closing member: As a matter of course, it will be possible to shut off the direct contract between the fluid and the hydrogen adsorption alloy by other methods:

The closing member wrapped with the film 9 is placed in a holder 10 and put together in a pressure vessel 6 incorporated in a press of uniform pressure, as shown in FIG. 1. When the preparation for pressing is completed, the top member 11 is put one and a lockpin 12 is inserted in a hole 13 provided laterally through the top member 11.

In this embodiment, when pressing with a press of uniform pressure, a necessary air pressure is supplied from a separate compressor 14, and pressure water is generated by actuating a water pump 15 with such air pressure. Thus a pressure is transferred to the pressure vessel through a pressure transfer inlet 16 formed at the bottom part of the vessel. As the water serving as a pressure medium passes through the water pump 15, it is preferred to add an emulsifier for emulsion of the water for the purpose of lubrication and rust prevention. in order to obtain a strong and closepacked compact, application of about 1.5–2 T/cm$^2$ of static pressure to the mold surface is quite sufficient.

An axial hole 17 is formed by taking out the core mold 2 after molding and drying.

Figure 4:
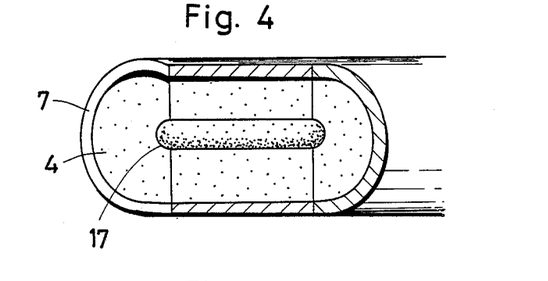
FIGS. 4 to 16 are partially cutaway perspective views showing various modifications.
Figure 5:
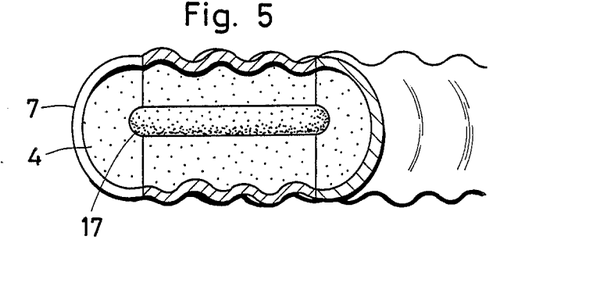
Figure 6:
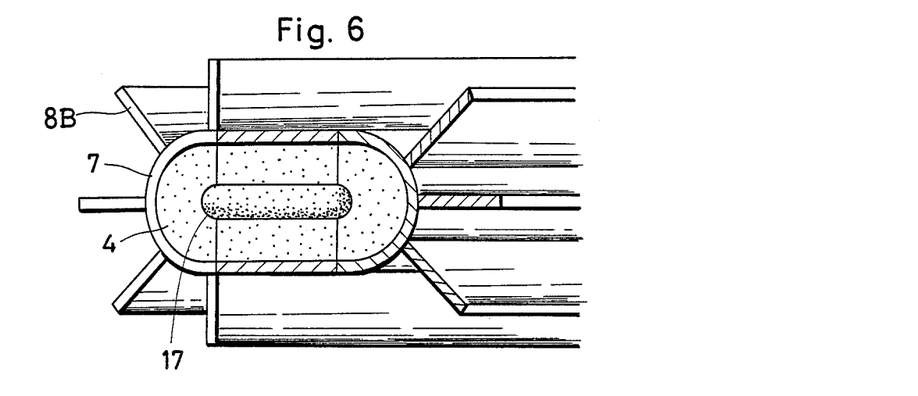
Figure 7:
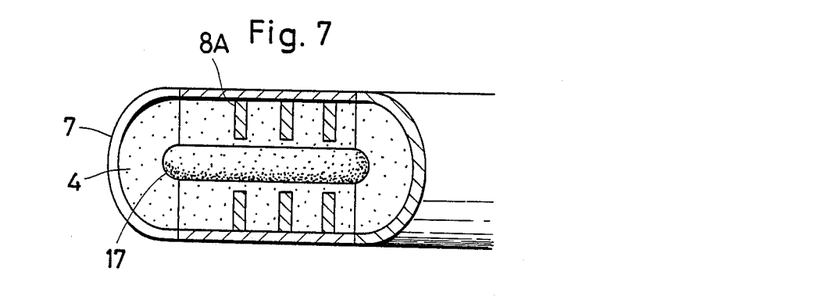
Figure 8:
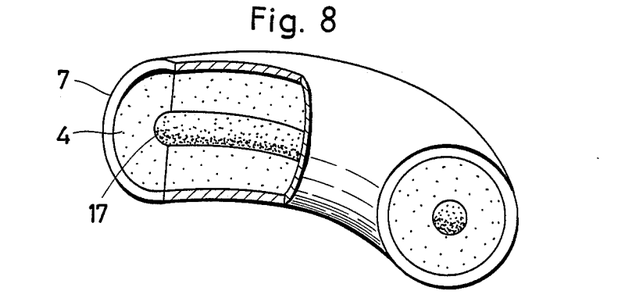
Figure 9:
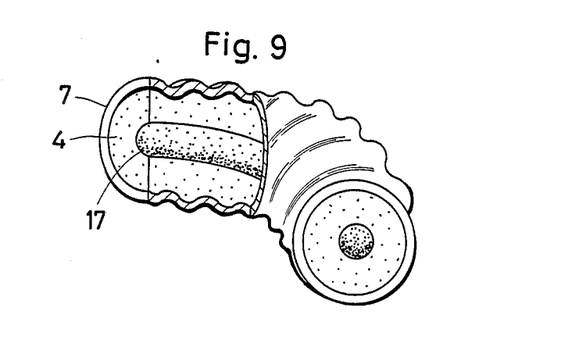
Figure 10:
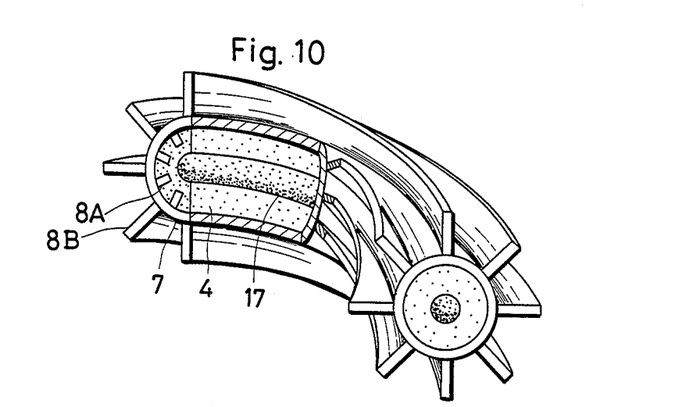
Figure 11:
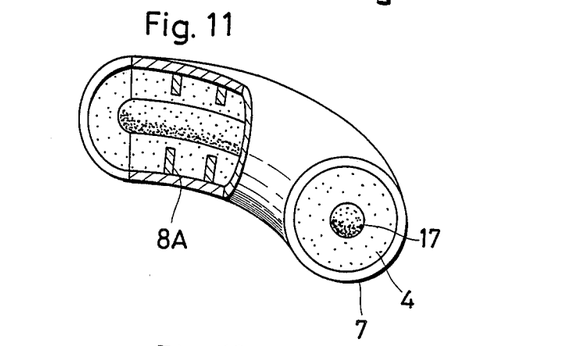
Figure 12:
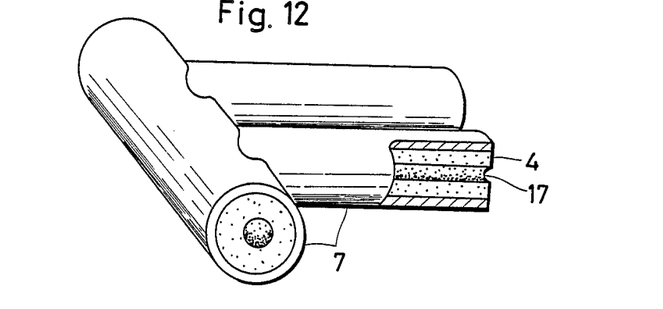
Figure 13:
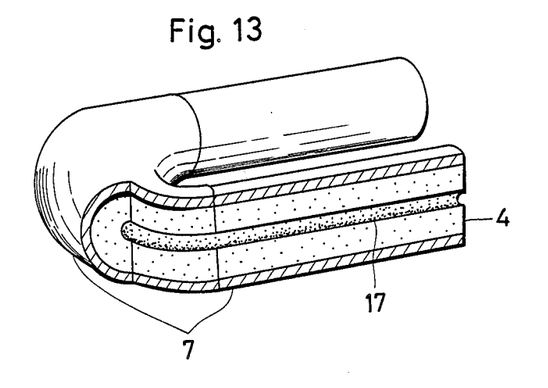
Figure 14:
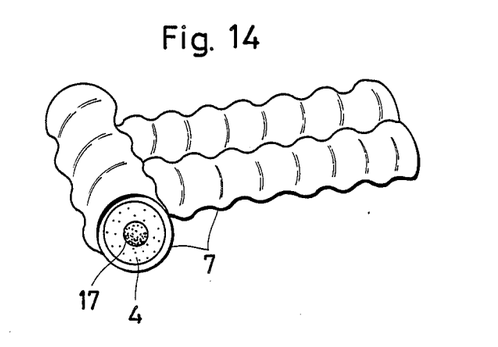
Figure 15:
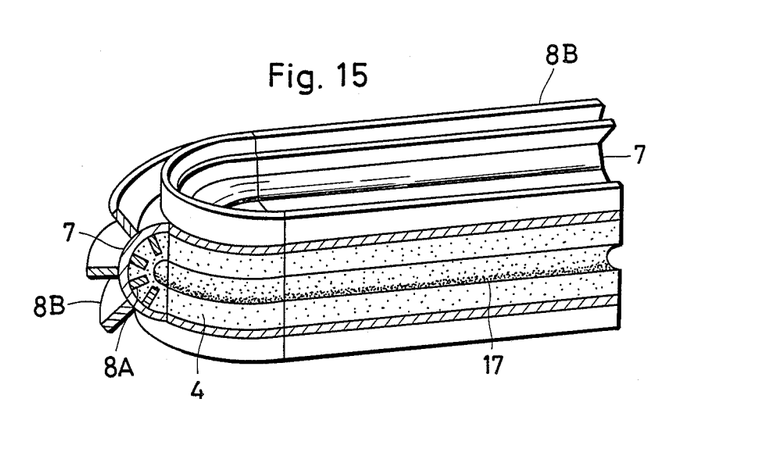
Figure 16:
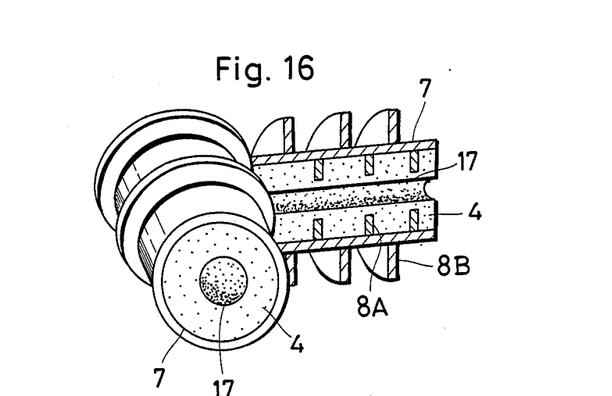

In FIGS. 4 to 16 various modifications of combination between the hydrogen adsorption alloy and the heat transfer element 1 (i.e., the heat transfer tube 7 and the fins 8) to be solidly formed are shown, FIG. 4 shows that the heat transfer tube comprises a straight tube, FIG. 5 shows the heat transfer tube comprises a straight corrugated tube, FIG. 6 shows the tube comprises a straight tube and radial fins, FIG. 7 shows the tube comprises a straight tube and fins making a right angle to the axis of tube, FIG. 8 shows the tube comprises a curved bend tube, FIG. 9 shows the tube comprises a curved corrugated tube, FIG. 10 comprises a bend tube and radial fins, FIG. 11 shows the tube comprises a bend tube and fins making a right angle to the axis of tube, FIGS. 12 and 13 show the tube comprises a combination of a plurality of straight tubes and/or bend tubes, FIG. 14 shows the tube comprises a combination of a plurality of straight corrugated tubes, FIG. 15 shows the tube comprises a combination of a plurality of straight tubes, a bend tube and radial fins provided on the respective tubes, and FIG. 16 shows the tube comprises a combination of a plurality of straight tubes and fins making a right angle to the axis of tube. As for the fins provided making a right angle to the axis of tube, those such as rectangular fins, spiral fins would continuously on the inner and/or outer periphery of the tube, etc. can be used other than round slice-shaped fins shown in FIGS. 7, 11 and 16.

As a peculiar effect of the modifications shown in FIGS. 5, 9, 14, irregularities are formed on the contact surface between the inner wall of the heat transfer tube and the hydrogen adsorption alloy, which improves engagement or tight fitting therebetween.

Described hereafter is a heat transfer effect exhibited by this invention and determined by quantitative measurement of several examples.

Examples to be measured or experimented comprise a copper tube of 0.5 mm in thickness and 16 mm in external diameter, copper fins of 0.5 mm in thickness and 35 mm in external diameter and which are welded at a pitch of 5 mm to the inner periphery of the tube, and particles of hydrogen adsorption alloy, these elements, being molded into a unit. At this process, the inner diameter of the axial hole is adjusted by controlling the pressure applied. Surfaces of the fine particles of hydrogen adsorption alloy composed of $LaNi_{4.5}Al_{0.5}$ are coated with copper by electroless plating using a reducer.

In this way, a combined material in which the hydrogen adsorption alloy and the copper are contained in the ratio of 100 to 20 is obtained, and this material is formed into three examples by means of a press of uniform pressure using a water as a medium and applying a pressure of 1.0 Y/cm$^2$ (Example 1), 1.5 T/cm$^2$ (Example 2) and 2.0 T/cm$^2$ (Example 3) respectively to the material. The inner diameters of the axial holes of these examples are respectively 6.6 mm, 9.0 mm and 9.6 mm.

On the other hand, a tube with fins is filled with fine particles of hydrogen adsorption alloy and formed into a unit as Control 1.

Then, fine particles of hydrogen adsorption alloy with their surfaces coated with copper in the same manner as the examples are formed into doughnutshaped pellets of 22 mm in external diameter, 9 mm in internal diameter and 10 mm in average thickness by applying a load of 5 T/cm$^2$ in one direction by a hydraulic one-way press, and by inserting the pellets engagedly having a tube, Control 2 is obtained in the similar appearance to the examples.

The examples and controls obtained in this manner are shown in the following Table 1.

TABLE 1

|  | Control 1 | Control 2 | Example 1 | Example 2 | Example 3 |
|---|---|---|---|---|---|
| Fine particles of hydrogen adsorption alloy | $LaNi_{4.5}Al_{0.5}$ | $LaNi_{4.5}Al_{0.5}$ | $LaNi_{4.5}Al_{0.5}$ | $LaNi_{4.5}Al_{0.5}$ | $LaNi_{4.5}Al_{0.5}$ |
| Coating | Not coated | Electroless plating with copper | Electroless plating with copper | Electroless plating with copper | Electroless plating with copper |
| Filling up (%) | 100 | 89 | 100 | 100 | 100 |
| Molding method | Not molded | One-way press 5 T/cm$^2$ | Uniform press 1.0 T/cm$^2$ | Uniform press 1.5 T/cm$^2$ | Uniform press 2.0 T/cm$^2$ |
| Density of filling up g/cm$^3$ | 2.3 | 5.6 | 4.5 | 5.0 | 5.1 |
| Diameter of hole in the unit | — | 9 | 6.6 | 9.0 | 9.6 |

Figure 17:
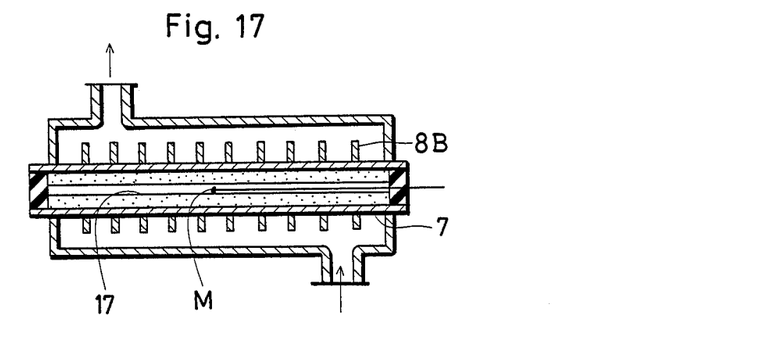
FIG. 17 is a sectional front view showing how to measure a quantitative effect of this invention.
Figure 18:
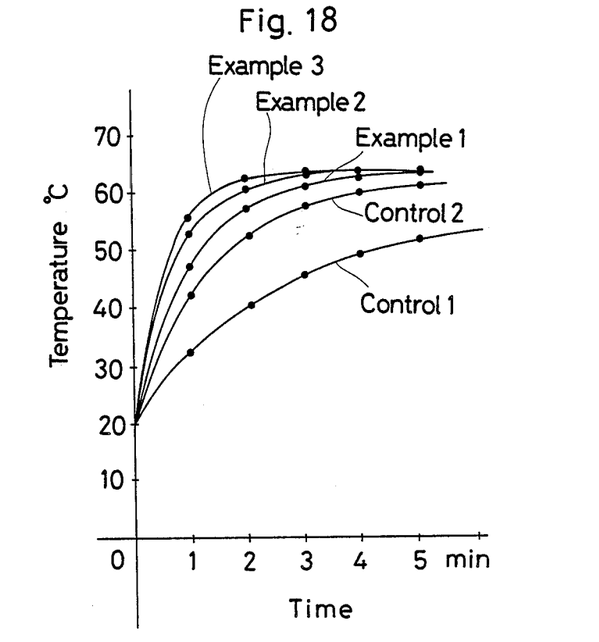
FIG. 18 is a curve of time and temperature to show one example of such effect.

Measurement of examples and controls is performed by projecting a heat transfer tube outward with both ends closed with caps as shown in FIG. 17 and setting an alumel-chromel thermo-couple to the center of the axial elongated hole (i.e., to a measuring point M). The unit is held in a cylinder of 45 mm in inner diameter being sealed from water, and an inlet and an outlet for hot water are provided on the front and rear parts (indicated by arrows) of the cylinder. Hot water of 65° C. flows in and out through the inlet and outlet. FIG. 18 shows curves of temperature indicated by the thermocouple with lapse of time.

As a result of measurements, it is found out that the difference is considerable in rise time up to a lapse of 1–2 minutes, which suggests a rapid heat transfer when applying a heat exchanging unit to a heat exchanger.

While the above-described embodiments represent the preferred forms of this invention, it is to be understood that further modifications will occur to those skilled in this art without departing from the spirit of this invention. The scope of this invention is therefore to be determined by the appended claims.

What is claimed is:

1. The combination comprising:
   a heat exchanging unit including: an elongated heat transfer element defining an inner surface; and a quantity of fine particles of hydrogen adsorption alloy coextensive with the inner surface of the heat transfer element for at least a part of its length in a condition such that the fine particles of hydrogen adsorption alloy are bonded to each other to form in close-packed compact, said compact being bonded to the inner surface of the heat transfer element with which it is coextensive;
   two spaced apart elastic cap members; and
   a hollow cylindrical elastic core mold, wherein:
   said core mold defines an outer surface the diameter of which is less than the diameter of the inner surface of the heat transfer element;
   each of said elastic cap members has an inner surface and an outer surface which surfaces engage a portion of the outer surface of the core mold and a portion of the inner surface of the heat transfer element, respectively; and
   said heat transfer element, core mold and cap members for a sealed unit due to the elasticity of the core mold and cap members when a pressure is applied to said combination, so that an even pressure is applied by the cap members, the inner surface of the heat transfer element and the outer surface of the core mold to the fine particles of hydrogen adsorption alloy for the integral formation of the heat exchanging unit.

2. A heat exchanging unit as claimed in claim 1, wherein said heat transfer element is a thermal conductive straight tube.

3. A heat exchanging unit as claimed in claim 1, wherein said heat transfer element is a straight corrugated tube manufactured by forging.

4. A heat exchanging unit as claimed, in claim 1, wherein said heat transfer element comprises a thermal conductive straight tube and a plurality of fins provided radially on an inner and/or outer periphery of the tube.

5. A heat exchanging unit as claimed in claim 1, wherein said heat transfer element comprises a thermal conductive straight tube and a plurality of fins provided on the inner and/or outer periphery of the tube making a right angle to the axis of the tube.

6. A heat exchanging unit as claimed in claim 1, wherein said heat transfer element is a bend tube.

7. A heat exchanging unit as claimed in claim 1, wherein said heat transfer element is a curbed corrugated tube manufactured by forging.

8. A heat exchanging unit as claimed in claim 1, wherein said heat transfer element comprises a thermal conductive bend tube and a plurality of fins provided radially on the inner and/or outer periphery of the tube.

9. A heat exchanging unit as claimed in claim 1, wherein said heat transfer element comprises a thermal conductive bend tube and a plurality of fins provided on the inner and/or outer periphery of the tube making a right angle to the axis of the tube.

10. A heat exchanging unit as claimed in claim 1, wherein said heat transfer element is a combination of a plurality of straight tubes and/or bend tubes.

11. A heat exchanging unit as claimed in claim 1, wherein said heat transfer element is a combination of a plurality of straight tubes and/or curved corrugated tubes manufactured by forging.

12. A heat exchanging unit as claimed in claim 1, wherein said heat transfer element is a combination of a plurality of straight tubes and/or bend tubes with a plurality of fins radially provided on the inner and/or outer peripheries of respective tubes.

13. A heat exchanging unit as claimed in claim 1, wherein said heat transfer element is a combination of a plurality of straight tubes and/or bend tubes with a plurality of fins provided on the inner and/or outer peripheries of respective tubes making a right angle to the tubes.

14. A heat exchanging unit as defined in claim 1, wherein the heat transfer element, the cap members and the core mold are wrapped with a thin, flexible film.

* * * * *